Patented Sept. 27, 1932

1,879,543

UNITED STATES PATENT OFFICE

FRITZ SCHWERDTEL, OF COLOGNE-MULHEIM, GERMANY, ASSIGNOR TO I. G. FARBEN-INDUSTRIE AKTIENGESELLSCHAFT, OF FRANKFORT-ON-THE-MAIN, GERMANY

PROCESS FOR THE COAGULATION OF LATEXLIKE EMULSIONS

No Drawing. Application filed December 16, 1930, Serial No. 502,863, and in Germany December 23, 1929.

The present invention relates to the coagulation of latexlike emulsions, obtained by the polymerization in emulsion of butadiene-(1.3), homologues and analogues thereof.

The artificial latexlike liquids obtainable by polymerization of diolefine in emulsion can frequently be coagulated by acid, much like the latex of natural rubber.

To this method is, however, attached the great technical disadvantage, that the emulsifying agent present in the latex remains in the coagulation product and can be removed therefrom only with difficulty and in a costly manner, for example, by extraction with organic solvents.

In accordance with the present invention and in contradistinction to natural latex the latices obtained by the polymerization of diolefines, which diolefines may be represented by the general formula:—

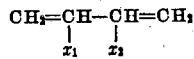

$x_1$ and $x_2$ meaning hydrogen or methyl, can be coagulated satisfactorily by the addition of an alkali metal salt. The process of coagulation by means of salts possesses the great technical advantage over the coagulation by means of acids that the emulsifying agent can easily be removed and recovered from the coagulation product by washing, thus avoiding the costly extraction above referred to.

A further advantage of the process consists in the fact that by this means artificial latices can be coagulated which cannot be coagulated by acids. When diolefines are polymerized in emulsions obtained by the use of salts of alkylated naphthalene sulfonic acids, such as the sodium salt of isobutyl naphthalene sulfonic acid or by the use of so-called acid emulsifiers, such as the hydrochloric acid salts of pentadecyl-$\mu$-glyoxalidine or of the $\omega$-diethylamino-4-ethoxy-anilide of oleic acid, the latexlike systems produced therefrom cannot be coagulated with acids, but can be coagulated with alkali metal salts. Suitable salts for the coagulation are alkali metal salts of inorganic or organic acids, such as, sodium-, potassium-, or ammonium-halides, carbonates, sulfates, nitrates, phosphates, acetates, benzene sulfonates, naphthalene sulfonates and the like. The salts are with advantage added in the form of concentrated aqueous solutions.

The concentration and amount of the salt solution to be employed depends not only on the quantity of the emulsifying agent, but also on the quantity of polymerization product contained in the latexlike liquid. The polymerization product is coagulated more readily from concentrated than from dilute latices.

It should be noted that such latexlike systems can likewise be coagulated with salts of polyvalent metals. In this case, however, compounds insoluble in water are often formed between the emulsifier and the metallic salt, which compounds become enclosed in the coagulation product during coagulation and can be removed only with difficulty.

The following examples illustrate the invention without restricting it thereto:—

Example 1

100 parts by weight of latex, produced by the polymerization of butadiene-(1.3) in emulsion by means of a 10% sodium oleate solution and containing 24 parts by weight of polymerization product are coagulated immediately and completely by the addition of 5 parts by weight of a saturated sodium chloride solution.

An analogous latex containing 15 parts by weight of polymerization product requires for coagulation 12 parts by weight of a saturated sodium chloride solution.

Example 2

100 parts by weight of a latex, produced by the polymerization of 2.3-dimethylbutadiene-(1.3) in emulsion by means of a 10% sodium oleate solution and containing 30 parts by weight of polymerization product are coagulated immediately and completely by the addition of 15 parts by weight of a saturated sodium acetate solution.

Example 3

100 parts by weight of a latex, produced by the polymerization of butadiene-(1.3) in emulsion by means of a 10% solution of the sodium salt of isobutyl naphthalene sulfonic acid and containing 20 parts by weight of polymerization product are coagulated immediately and completely by the addition of 10 parts by weight of a saturated sodium carbonate solution.

*Example 4*

100 parts by weight of a latex, produced by the polymerization of butadiene-(1.3) in emulsion by means of a 3% solution of the hydrochloride of the ω-diethylamino-4-ethoxy-anilide of oleic acid and containing 45 parts by weight of polymerization product are coagulated immediately by the addition of 5 parts by weight of a saturated disodium phosphate solution.

I claim:—

1. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto an alkali metal salt.

2. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto an inorganic alkali metal salt.

3. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto an alkali metal halide.

4. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto sodium chloride.

5. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto an aqueous solution of an alkali metal salt.

6. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto a concentrated aqueous solution of an alkali metal salt.

7. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto a concentrated aqueous solution of an inorganic alkali metal salt.

8. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto a concentrated aqueous solution of an alkali metal halide.

9. The process which comprises coagulating a latexlike emulsion obtained by the polymerization in emulsion of a diolefine hydrocarbon of the general formula:—

$$CH_2=C-C=CH_2$$
$$\quad\ |\ \ |$$
$$\ \ x_1\ x_2$$

wherein $x_1$ and $x_2$ stand for hydrogen or methyl, by adding thereto a concentrated aqueous solution of sodium chloride.

10. The process which comprises coagulating a latexlike emulsion obtained by the polymerization in emulsion of butadiene-(1.3) by adding thereto an alkali metal salt.

11. The process which comprises coagulating a latexlike emulsion obtained by the polymerization in emulsion of butadiene-(1.3) by adding thereto an inorganic alkali metal salt.

12. The process which comprises coagulating a latexlike emulsion obtained by the polymerization in emulsion of butadiene-(1.3) by adding thereto an alkali metal halide.

13. The process which comprises coagulating a latexlike emulsion obtained by the polymerization in emulsion of butadiene-(1.3) by adding thereto sodium chloride.

14. The process which comprises coagulating a latex-like emulsion obtained by the polymerization in emulsion of butadiene-(1.3) by adding thereto an aqueous solution of an alkali metal salt.

15. The process which comprises coagulating a latexlike emulsion obtained by the polymerization in emulsion of butadiene-(1.3) by adding thereto a concentrated aqueous solution of an alkali metal salt.

16. The process which comprises coagulating a latexlike emulsion obtained by the polymerization in emulsion of butadiene-(1.3) by adding thereto a concentrated aqueous solution of an inorganic alkali metal salt.

17. The process which comprises coagulating a latexlike emulsion obtained by the polymerization in emulsion of butadiene-(1.3) by adding thereto a concentrated aqueous solution of an alkali metal halide.

18. The process which comprises coagulating a latexlike emulsion obtained by the polymerization in emulsion of butadiene-(1.3) by adding thereto a concentrated aqueous solution of sodium chloride.

In testimony whereof, I affix my signature.

FRITZ SCHWERDTEL.